United States Patent
Dunne et al.

(10) Patent No.: US 10,343,811 B1
(45) Date of Patent: Jul. 9, 2019

(54) BIN DESIGN AND CONFIGURATION FOR INCREASED SORT DESTINATION DENSITY

(71) Applicant: Amazon Technologies, Inc., Seattle, WA (US)

(72) Inventors: Emily Dunne, Seattle, WA (US); Samuel Gardner Garrett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/643,295

(22) Filed: Jul. 6, 2017

(51) Int. Cl.
*B65D 5/42* (2006.01)
*B65G 1/137* (2006.01)

(52) U.S. Cl.
CPC ......... *B65D 5/4208* (2013.01); *B65G 1/1376* (2013.01)

(58) Field of Classification Search
CPC ........ B65D 5/42–5/4208; B65G 1/00–1/1376; Y10S 220/908
USPC ..... 220/908–911, 23.83; 211/88.01–119.013, 211/126.5; 248/311.2
See application file for complete search history.

(56) References Cited

U.S. PATENT DOCUMENTS

| | | | |
|---|---|---|---|
| 2,891,678 A * | 6/1959 | Levy ..................... | A47F 5/0025 211/133.6 |
| 3,252,614 A * | 5/1966 | Evans ................ | B65D 21/0212 108/152 |
| 3,502,294 A * | 3/1970 | Kalbow ................ | A47F 5/0025 211/41.2 |
| 3,606,949 A * | 9/1971 | Joyce ..................... | A47B 87/02 108/91 |
| 3,726,411 A * | 4/1973 | Jones .................... | A47F 5/0025 211/126.13 |
| 4,015,886 A * | 4/1977 | Wickenberg ........... | A47B 87/00 206/509 |
| 4,109,797 A * | 8/1978 | Brunette ................. | A47F 5/12 108/108 |
| 4,896,456 A * | 1/1990 | Grant ..................... | A01G 9/024 47/67 |
| 5,050,768 A * | 9/1991 | Alden ................... | B65F 1/0046 220/533 |
| 2005/0002772 A1* | 1/2005 | Stone ....................... | B65G 1/00 414/788 |
| 2005/0067850 A1* | 3/2005 | Morales ................... | B60N 3/08 296/37.1 |
| 2005/0075230 A1* | 4/2005 | Moshier ................... | B65D 5/02 493/51 |

(Continued)

*Primary Examiner* — Kareen K Thomas
(74) *Attorney, Agent, or Firm* — BakerHostetler (57) ABSTRACT

A bin for a sorting rack includes induction and outlet endwalls each elongated along a lateral direction and opposite each other along a perpendicular longitudinal direction. A pair of opposed sidewalls extends from the induction to the outlet endwall. Each sidewall defines a top edge. A pair of opposed mounting flanges extends outwardly from respective external surfaces of the sidewalls. Each mounting flange defines a longitudinal flange axis oriented along the longitudinal direction. A floor extends from the induction to the outlet endwall with respect to the longitudinal direction and between the sidewalls with respect to the lateral direction. The floor and top edges of the sidewalls are each declined toward the outlet endwall at an angle in a range of about 6 and 14 degrees with respect to the longitudinal flange axis. A height of the induction endwall is no more than 70% of each sidewall height.

20 Claims, 6 Drawing Sheets

(56) References Cited

U.S. PATENT DOCUMENTS

| | | | | |
|---|---|---|---|---|
| 2007/0041815 A1* | 2/2007 | Wirz | ............... | B65G 1/0407 |
| | | | | 414/288 |
| 2007/0295680 A1* | 12/2007 | Budge | ............... | B65G 1/02 |
| | | | | 211/85.18 |
| 2008/0152466 A1* | 6/2008 | Bonora | ............... | B65G 1/0407 |
| | | | | 414/222.07 |
| 2014/0039669 A1* | 2/2014 | Lykkegaard | ............... | B65G 31/02 |
| | | | | 700/218 |
| 2015/0257533 A1* | 9/2015 | Yang | ............... | A47K 1/09 |
| | | | | 220/4.01 |

* cited by examiner

BIN DESIGN AND CONFIGURATION FOR INCREASED SORT DESTINATION DENSITY

BACKGROUND

In a materials handling facility, such as an order fulfilment center, multiple customer orders are received, where each order specifies one or more items from inventory to be shipped to the customer that submitted the order. To fulfill the customer orders, the one or more items specified in each order may be retrieved, or picked, from inventory (which may also be referred to as stock storage) in the materials handling facility. Under direction of a control system, picked items may be singulated and then inducted into a conveyance mechanism that routes the items to particular destinations, such as sorting stations, in accordance with the customer orders currently being processed. From the sorting station, the items can be directed to an order processing station, such as a packing station at which one or more units of items for an order are processed, packed, and labeled for shipping to the customer. A picked, packed and shipped order does not necessarily include all of the items ordered by the customer, as an outgoing shipment to a customer may include only a subset of the ordered items available to ship at one time from the materials handling facility.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

Figure 1:
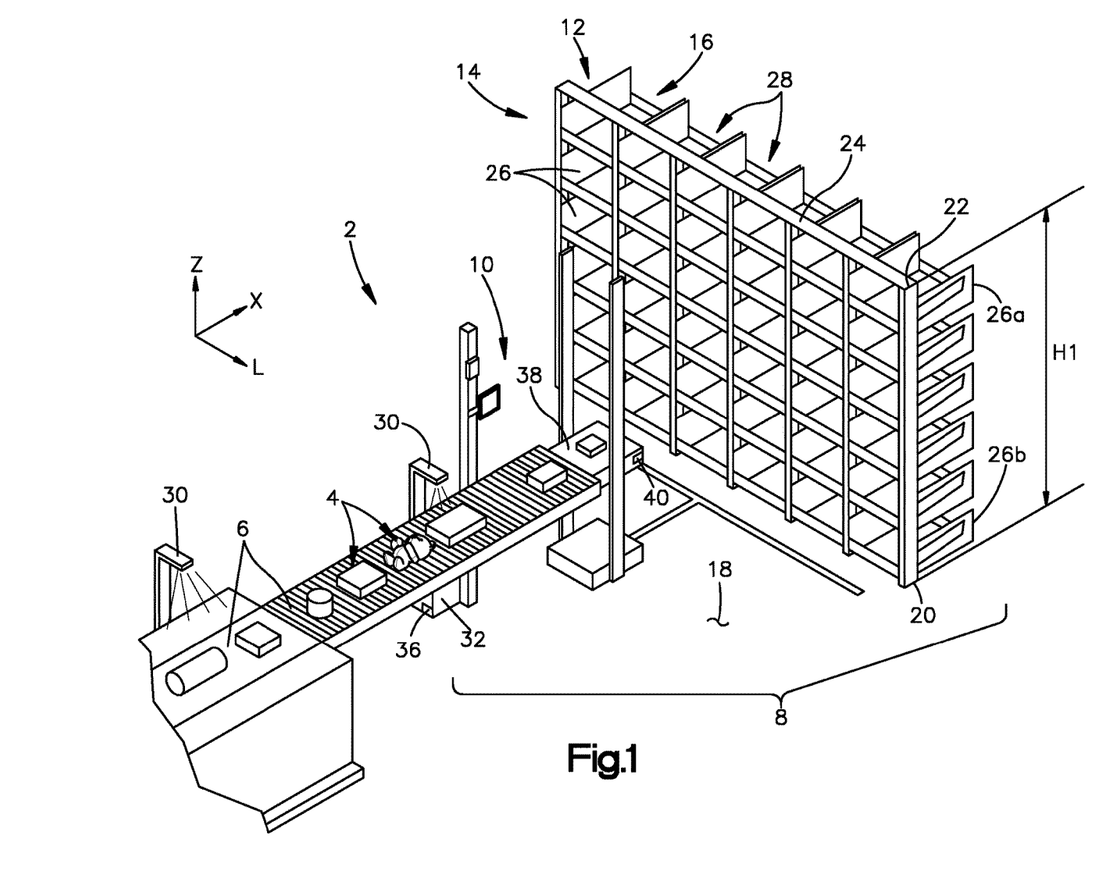
FIG. 1 shows a system diagram of a bin system for organizing items in an order fulfilment center into bins corresponding to distinct customer orders, according to an embodiment of the present disclosure.

Referring to FIG. 1, an item sorting system 2, also referred to as a "bin system," is shown for organizing items 4 in a materials handling facility, such as an order fulfilment center, into units corresponding to distinct customer orders. The system 2 includes one or more conveyors 6 that convey singulated items 4 to a sorting station 8, which includes a staging location 10 generally adjacent a sorting wall 12 (also referred to herein as a "rack"). The rack 12 can define an induction side 14 and an outlet side 16 spaced from each other along a longitudinal direction X. The rack 12 can be installed on a floor 18 of the fulfilment center. A bottom 20 of the rack 12 can rest upon or be affixed to the floor, and a top 22 of the rack 12 can be spaced from the bottom 20 along a vertical direction Z. A cross-beam 24 can be positioned at the top 22 of the rack 12 and can extend along a lateral direction Y to enhance the stability of the rack 12. The rack 12 can define a rack height H1 measured from the bottom of the rack 12 to the bottom of the cross-beam 24 along the vertical direction Z. In some embodiments, the rack height H1 can be between about 48 inches and about 60 inches, while other rack heights H1, including heights above 60 inches, are within the scope of the present disclosure.

The staging location 10 is positioned on the induction side 14 of the rack 12. The rack 12 carries bins 26 arranged in columns 28 so that the bins 26 of each column 28 are vertically aligned with one another along the vertical direction Z. The bin columns 28 can be arranged side by side along the lateral direction Y. The horizontal, lateral, and vertical directions X, Y, Z are each orthogonal with one another. The longitudinal and lateral directions X, Y can be termed "horizontal" directions. A topmost bin 26a of a column 28 can be adjacent the top of the rack 12, and a bottommost bin 26b of a column 28 can be adjacent, or even abut, the floor 18. While the bins 26 depicted in FIG. 1 are shown as being substantially the same size, it is to be appreciated that bins 26 of various sizes can be employed on the rack 12. By way of non-limiting example, the rack 12 can carry "small," "medium", "large", and "extra large" bins 26. The bins 26 preferably are formed of a commercial plastic, and can be formed in an injection molding, vacuum forming, or 3D printing process, by way of non-limiting examples. It is to be appreciated that other constituent materials and forming processes are within the scope of the present disclosure.

The system 2 can include one or more sensors 30 that scan each items 4 on the conveyors 6. The sensors 30 can be in communication with a processor 32 so that data generated by the sensors 30 can be transmitted to the processor 32, which interprets the data and affects operation of the system 2 based on the data. One of the sensors 30 can scan each items 4 on the conveyor 6 in a manner allowing the processor 32 to uniquely identify each items 4 and allocate each items 4 into a unit of items 34 (shown below in FIG. 7) that corresponds to a distinct customer order. For example, in some embodiments, one such sensor 30 can be an optical scanner that reads a barcode or other optically encoded tag carried by each items 4. In other embodiments, for example, the sensor 30 can be a radio frequency identification (RFID) transmitter/receiver that senses a radio signal transmitted by an RFID chip or tag carried by each items 4. Other sensor types for uniquely identify each items 4 are within the scope of the present disclosure.

Figure 7:
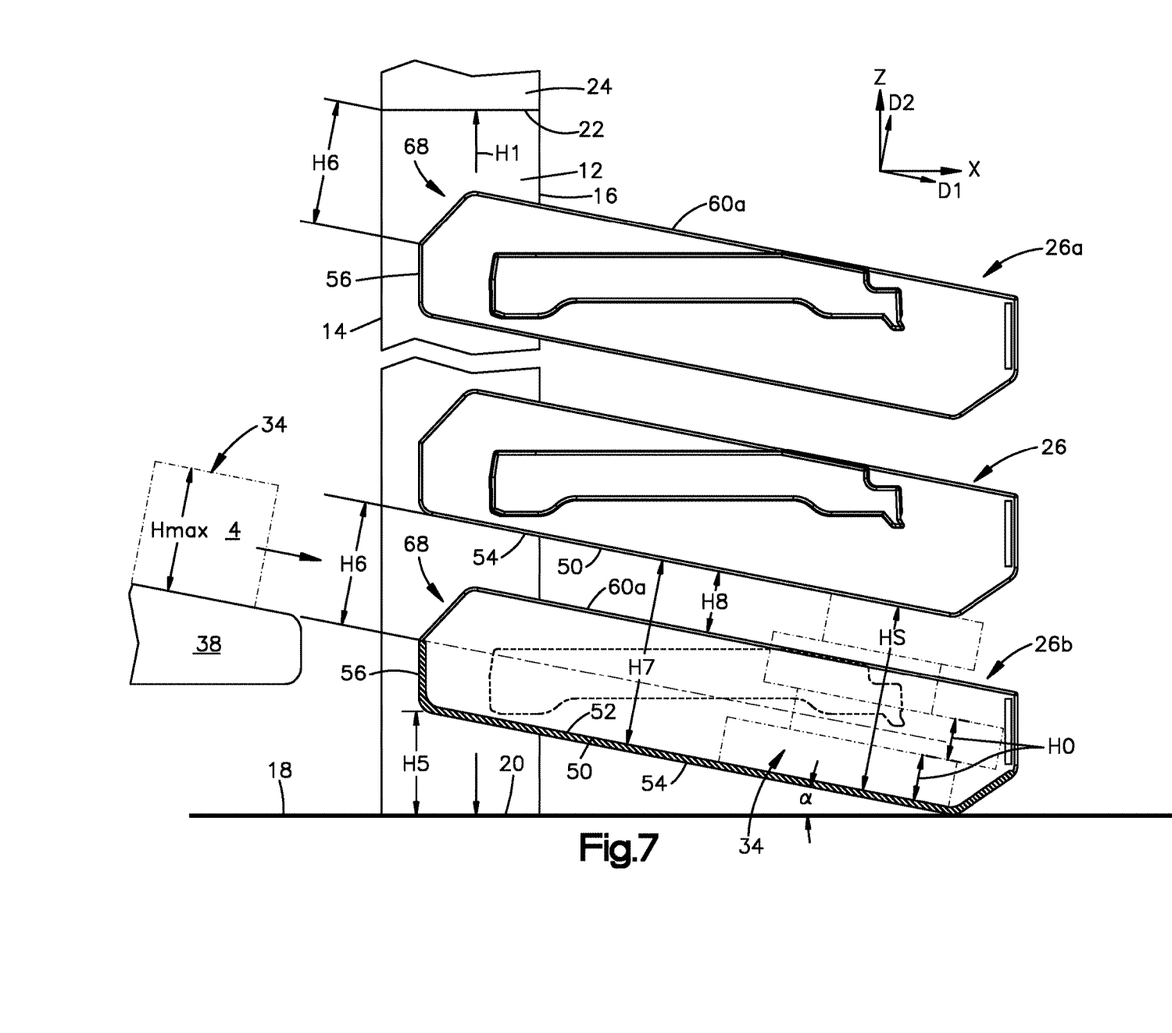
FIG. 7 shows a partial side view of a column of vertically aligned bins mounted to a sorting rack.

Another one of the sensors 30 can scan each items 4 on the conveyor 6 and generate data that the processor 32 can interpret to identify a minimum dimension H0 for each items 4. Such a sensor 30 can be an optical sensor that generates image data, or other well-known means for generating image or dimension information, and the processor 32 run software so as to execute one or more image detection algorithms to identify the minimum dimension for each items 4. In other embodiments, the system 2 can store pre-acquired dimension data (including the minimum dimension H0) for each items 4 in computer memory 36. The computer memory 36 with the stored dimension data can be in communication with the processor 32 so that the processor 32 can identify the minimum dimension H0 of each items 4 based on its unique identification. In such embodiments, the additional sensor for sensing the minimum dimension H0 of each items 4 can be omitted or can optionally be one or more "pacing" type sensors that can identify whether an item 4 exceeds the length requirements for the system 2 so that any such over-length items can be removed from the conveyor 6. In any of the foregoing embodiments, once the minimum dimension H0 of each items 4 is identified or ascertained, the processor 32 can calculate a sum HS of the minimum dimensions H0 of each unit 34 (FIG. 7). The sum HS of the minimum dimensions H0 can define a theoretical "stacking height" of the unit 34 if the items 4 thereof were each stacked one on top of the other. It is to be appreciated that the items 4 can be singulated, or otherwise repositioned by the conveyors 6, so that the minimum dimension H0 of each item 4 extends along the vertical direction Z and thus determines the stacking height of each unit 34. Once the sum HS has been calculated for a particular unit 34, the processor 32 can identify and reserve a bin 26 for the unit 34 such that the bin 26 is chosen to have a size to accommodate the sum HS, as set forth in more detail below.

The system 2 can include a shuttle 38 that is configured to transport each items 4 from the staging location 10 to the bin 26 that has been reserved for the unit 34 to which the items 4 belong. The shuttle 38 can be in communication with the processor 32 and can be configured to move the items 4 in three dimensional space from the staging location 10 to any one of the bins 26 on the rack 12 responsive to commands received from the processor 32. For example, the shuttle 38 can move along the longitudinal direction X between the staging location 10 and the induction end of the rack 12. The shuttle 38 can also be configured to move along the vertical direction Z to move items 4 to any of the vertically aligned bins 26 in a column 28. The shuttle 38 can also be configured to move along the lateral direction Y to shuttle items 4 to bins 26 within the laterally spaced columns 28. The shuttle 38 can optionally carry a sensor 40, such as an optical sensor, that is configured to identify at least one feature presented by each bin 26 so that the system 2 can align the shuttle 38 with each of the bins 26, respectively, in a position to deposit items 4 into the bin 26. The shuttle 38 can be fully automated, although, in other embodiments, the shuttle 38 can be directed by a human operator to each of the bins 26.

Figure 2:
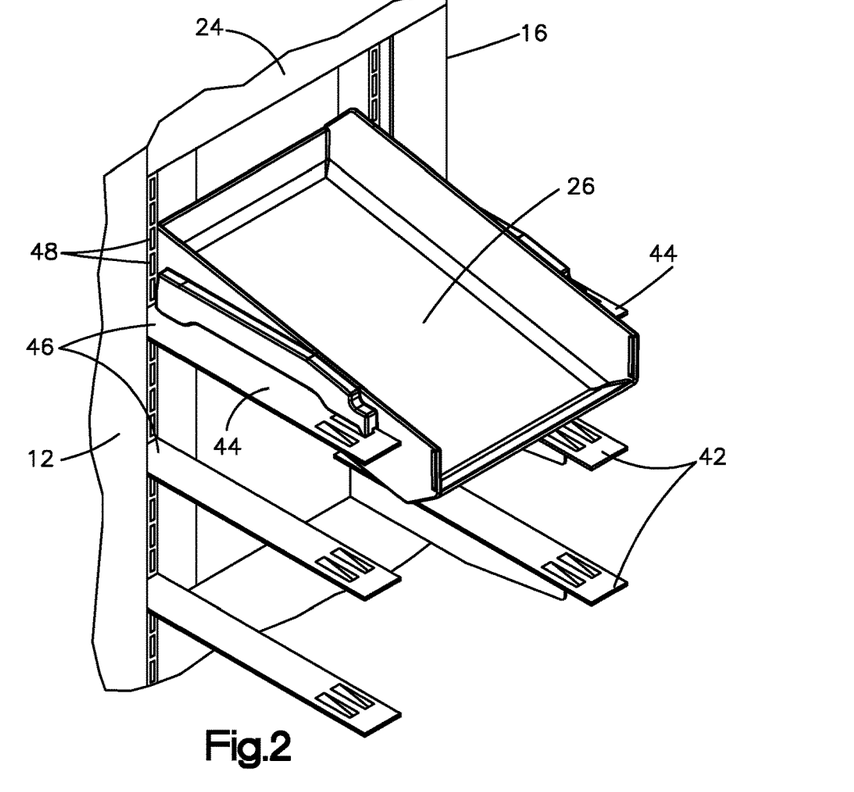
FIG. 2 shows a perspective view of a sorting rack carrying vertically arranged bins, according to an embodiment of the present disclosure.
Figure 3:
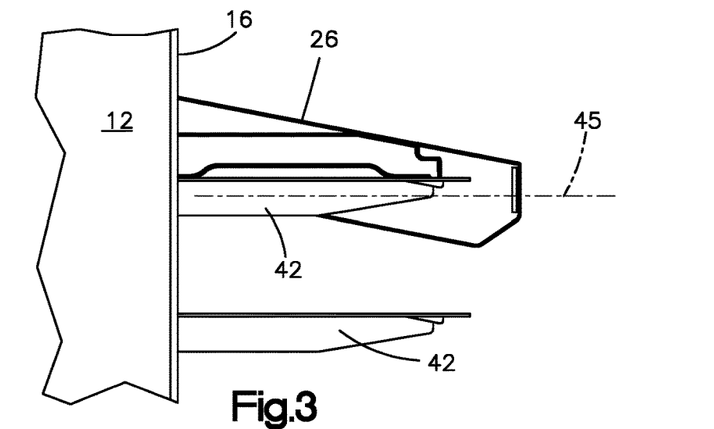
FIG. 3 shows a side view of a portion of the rack of FIG. 2.

Referring now to FIGS. 2 and 3, the bins 26 can be supported by supporting features, such as bracket arms 42, that are either monolithic with the rack 12 or attached thereto. For example, the bins 26 can be supported by bracket arms 42 attached to the outlet side 16 of the rack 12. As shown, each bin 26 can be mounted to a pair 44 of bracket arms that extend outwardly from the outlet side 16 of the rack 12 along the longitudinal direction X, such that a longitudinal axis 45 of each bracket arm is 44 is horizontal. Stated differently, the longitudinal axis 45 of each bracket arm 42 is oriented along (i.e., is parallel with) the longitudinal direction X. The bracket arm pairs 44 can be spaced from each other along the vertical direction Z so that the bins 26 attached thereto are vertically aligned as set forth above, such that an induction end of each bin 26 in a column is vertically aligned in the same plane or approximately in the same plane. The bracket arms 42 can optionally be configured to repeatedly attach to and detach from mounting features of the rack 12. For example, proximal ends 46 of the bracket arms 42 can define protrusions that matingly extend within slots 48 defined on the outlet side 16 of the rack 12. In this manner, the bracket arms 42 can be repositioned on the rack 12 so as to accommodate bins 26 of various sizes.

Figure 4:
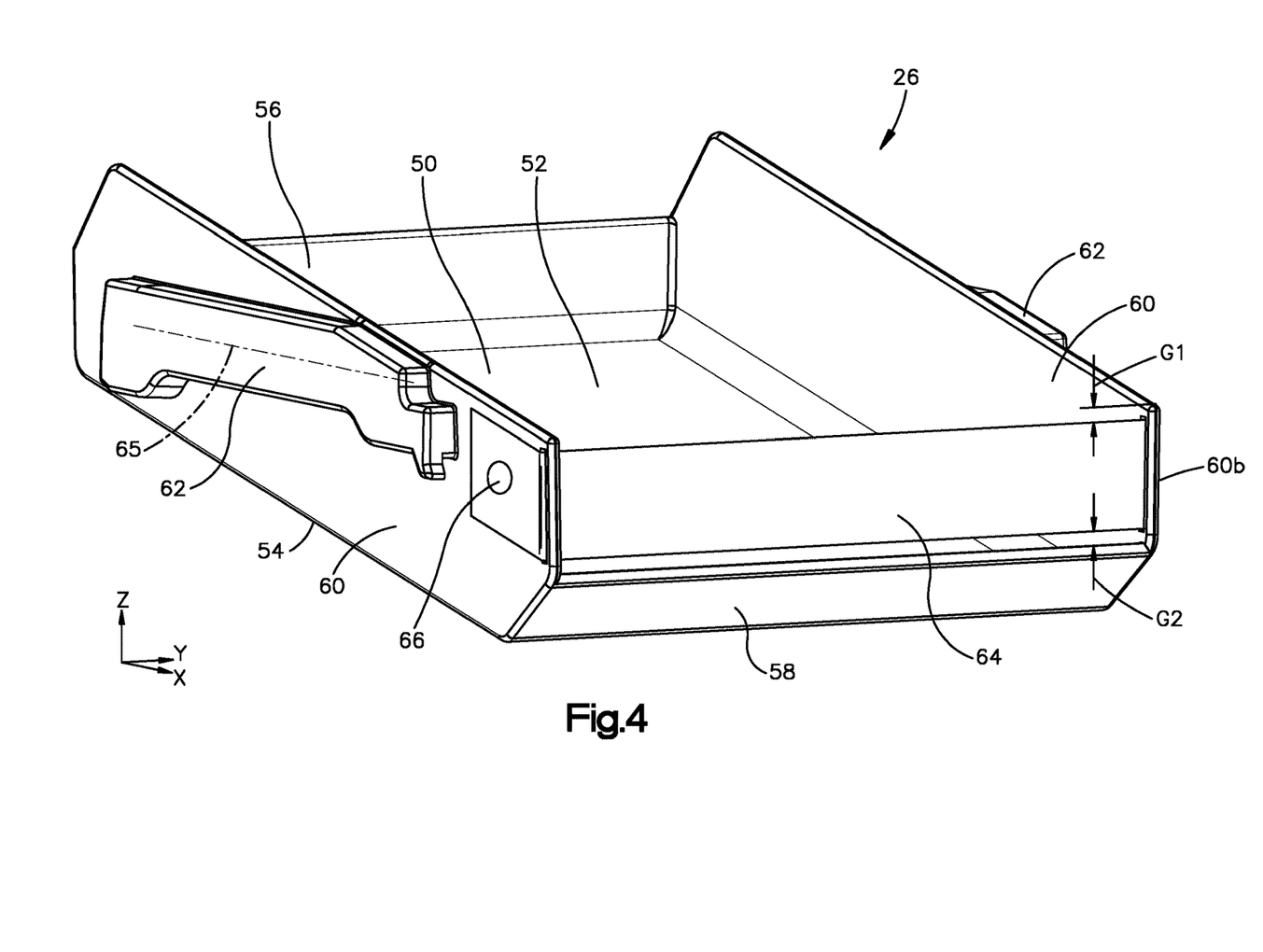
FIG. 4 shows a perspective view of bin, according to an embodiment of the present disclosure.
Figure 6:
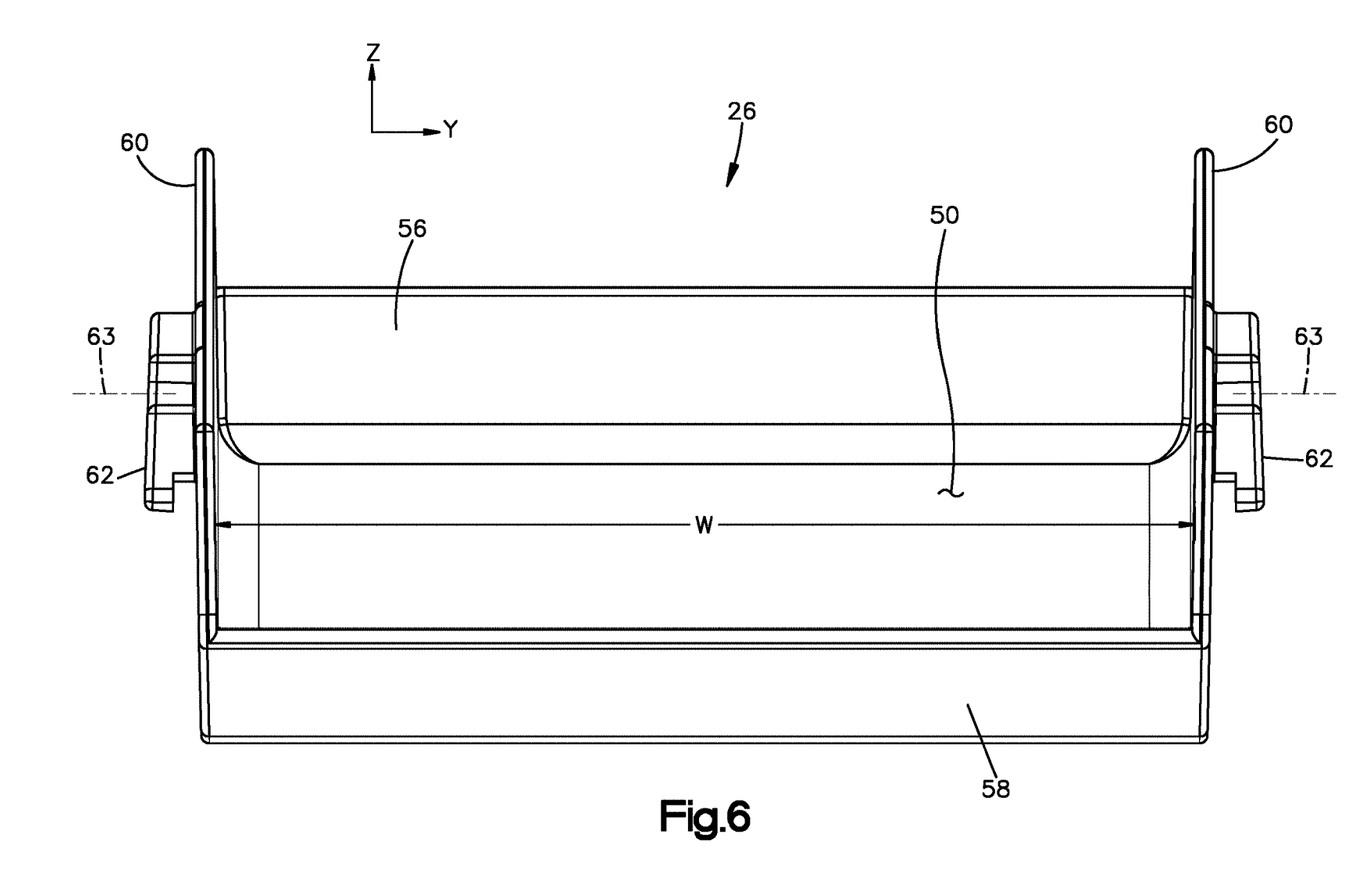
FIG. 6 shows a front view of the bin of FIG. 4.

Referring now to FIG. 4, each bin 26 can define a floor 50 having an upper surface 52 for supporting items 4 and an opposed lower surface 54 that defines an underside of the bin 26. The bin 26 can define an induction endwall 56 accessible from the induction side 14 of the rack 12, and an outlet end wall 58 opposite the induction endwall 56 with respect to the longitudinal direction X. The outlet endwall 58 can be positioned outwardly from the outlet side 16 of the rack 12 so that items 4 contained in the bin 26 can be accessed by an operator on the outlet side 16 of the rack 12. As shown, the induction endwall 56 can be oriented along the vertical direction Z when the bin 26 is mounted to the rack 12, although other orientations are within the scope of the present disclosure. The bin 26 can also define a pair of opposed lateral sidewalls 60 extending from the induction endwall 56 to the outlet endwall 58. Each of the sidewalk 60 can extend upwardly from the floor 50 along the vertical direction Z. The bin 26 can include a pair of mounting formations, such as mounting flanges 62, extending laterally outwardly from the sidewalls 60. For example, each mounting flange 62 can extend outwardly from the opposed lateral sidewalk 60 along a lateral flange axis 63 that is oriented along (i.e., parallel with) the lateral direction L (FIG. 6). Additionally, each mounting flange 62 can define a longitudinal flange axis 65 that is oriented along (i.e., parallel with) the longitudinal direction L. Accordingly, the longitudinal flange axis 65 is parallel with the longitudinal axis 45 of the bracket arms 42. Each pair of mounting flanges 62 can be configured to attach to any of the pairs of bracket arms 44 so as to mount the bin 26 on the rack 12. It is to be appreciated that other types of rack supporting features, and bin mounting formations that mate therewith, are within the scope of the present disclosure.

A flexible band 64 can optionally be positioned above the outlet endwall 58 and can be configured to prevent items 4 from inadvertently sliding beyond the outlet endwall 58 and out of the bin 26. The band 64 can extend through slots formed at outlet ends 60b of the sidewalls 60 and can be coupled to attachment features 66 at external sides of the sidewalls 60. The band 64 can be sized to define a vertical gap G1 between the band 64 and the top edge 58a of the outlet endwall 58 and another vertical gap G2 between the band 64 and a top edge 60a of the sidewalls 60.

Figure 5:
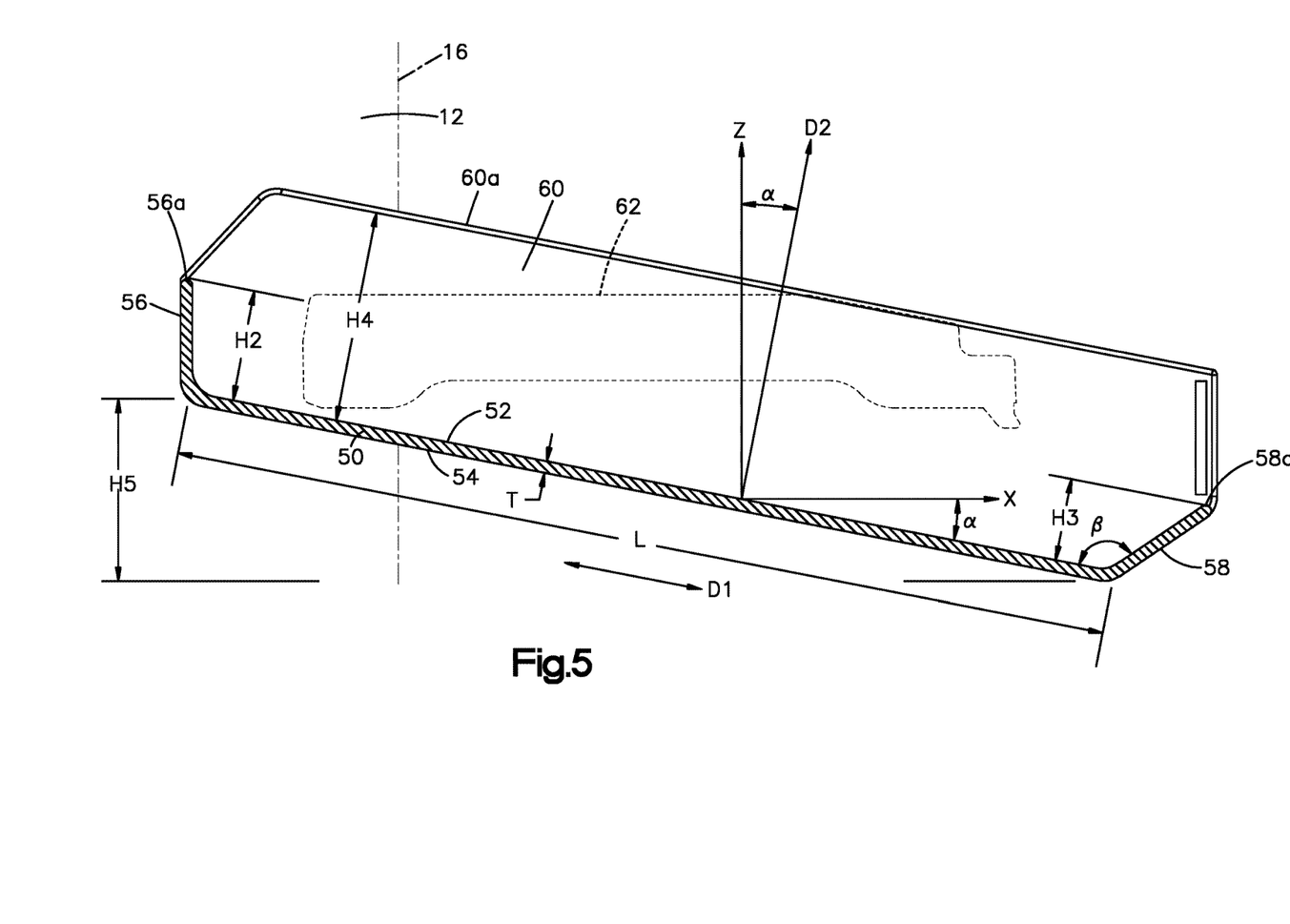
FIG. 5 shows a sectional side view of the bin of FIG. 4.

Referring now to FIG. 5, the floor 50 of the bin 26 preferably is sloped downward at a slope angle α in the range of about 6 degrees and about 14 degrees with respect to the longitudinal direction X. In some embodiments, the slope angle α can be in the range of about 7 degrees and about 11 degrees. The slope angle α can be tailored so that items 4 deposited in the bin 26 are biased by gravity toward the outlet endwall 58. This can inhibit items 4 from collecting or bunching up near the induction endwall 56. The upper surface 52 of the floor 50 can be substantially smooth for the same purpose (i.e., reducing or minimizing a coefficient of friction along the upper surface 52 for influencing the deposited items 4 toward the outlet endwall 58). The slope angle α can also be limited so that the items 4 are inhibited from bunching up undesirably at the outlet end wall 58. The outlet endwall 58 can be oriented at an obtuse angle β in the range of about 90 degrees and about 160 degrees with respect to the vertical direction Z. In other embodiments (not shown), the outlet endwall 58 can include a lip extending from the sloped portion of the outlet endwall 58 along the vertical direction Z, and the lip can optionally be oriented parallel with the induction endwall 56. In additional embodiments, the outlet endwall 58 can have one or more curved portions, straight portions, or any combination thereof. It is to be appreciated that other configurations of the outlet endwall 58 are within the scope of the present disclosure.

The size and shape of the bins 26 preferably are tailored so as to enhance sorting and storage of the items 4 stored therein. For example, the bin floor 50 can define a length L measured along a direction D1 oriented at the slope angle α (i.e., the "slope direction"). The bin floor 50 can define a width W measured along the lateral direction Y (FIG. 6) and a thickness T measured along a direction D2 orthogonal to the floor 50 (i.e., the "orthogonal direction"). The induction endwall 56 can define a height H2 measured from the upper surface 52 of the floor 50 to a top edge 56a of the induction endwall 56 along the orthogonal direction D2. The outlet endwall 58 can define a height H3 measured from the upper surface 52 of the floor 50 to a top edge 58a of the outlet end wall 58 along the orthogonal direction. The sidewalk 60 can each define a height H4 from the upper surface 52 of the floor 50 to the top edge 60a of each sidewall 60 along the orthogonal direction. Heights H2-H4 can each be measured along the orthogonal direction D2. In some embodiments, the length L can be greater than the width W by a factor in the range of about 1.2 and about 1.8. Additionally, the induction endwall height H2 can be less than the sidewall height H4. The outlet endwall height H3 can be less than the induction endwall height H2; however, in other embodiments, the outlet endwall height H3 can be equivalent to or greater than the induction endwall height H2.

The bin floor 50 preferably defines a slope height H5 measured between the upper and lower extremities of the lower surface 54 of the floor 50 along the vertical direction Z (with respect to the orientation at which the bin 26 is mounted to the rack 12), The slope height 115 can be expressed by the following equation: $H5=L \cdot \tan(\alpha)$.

In one example embodiment of a "small" sized bin 26, the floor length L is in the range of about 15 inches and about 20 inches, and preferably about 18 inches; the floor width W is in the range of about 9 inches and 15 inches, and preferably about 12 inches; the induction endwall height 1-1.2 is in the range of about 1 inch and about 3 inches, and preferably about 2 inches; the outlet endwall height H3 is in the range of about 1 inch and about 3 inches, and preferably about 1.5 inches; the sidewall height H4 is in the range of about 2 inches and about 6 inches, and preferably about 4 inches; and the slope angle a is in the range of about 6 degrees and about 14 degrees, and preferably in the range of about 7 degrees and about 11 degrees. The resultant slope height H5 can be in the range of about 1.75 inches and about 4 inches. In some embodiments, the induction endwall height H2 is no more than half of the sidewall height H4. For a "large" bin, the sidewall height H4 can be about 11 inches, and the induction and outlet endwall heights H2, H3 can each be as high as or less than the sidewall height H4, by way of non-limiting examples.

One benefit of sizing the induction endwall height H2 at least at about 1.5 inches is that the induction endwall 56 can have sufficient surface area to present an identifying feature 70—such as a barcode, tag, or even surface qualities of the wall 26 itself, such as reflective qualities—to the optical sensor 40 of the shuttle 38 so that the shuttle 38 can align itself with the bin 26 to deposit items 4 into the bin 26 through the opening 68. However, in other embodiments, the bin 26 can optionally have no induction endwall 56 so that the bin 26 is entirety open at the induction end thereof.

It is to be appreciated that the bins 26 can be sized such that foregoing heights H2, H3, and H4 measured along the orthogonal direction D2 can also be applicable along the vertical direction V. For example, the bins 26 can be sized such that: the vertical component of the induction endwall height H2 can be in the range of about 1 inch and about 3 inches; the vertical component of the outlet endwall height H3 can be in the range of about 1 inch and about 3 inches; and the vertical component of the sidewall height H4 can be in the range of about 2 inches and about 6 inches.

Referring now to FIG. 7, the bins 26 can be arranged on the rack 12 so as to increase the sorting density of items 4 on the rack 12. Items 4 can be deposited into each bin 26 through an induction opening 68 extending above the top edge 56a of the induction endwall 56. The induction opening 68 can define an opening height H6 measured along the orthogonal direction D2. For each (except the topmost) bin 26, the opening height H6 can extend from the top edge 56a of the induction endwall 56 to the lower surface 54 of the floor 50 of the bin 26 that is positioned immediately above. For the topmost bin 26a, the opening height H6 can extend from the top edge 56a of the induction endwall 56 to the bottom of the cross-beam 24 at the top of the rack 12.

The opening height H6 represents the maximum height Hmax of an item 4 that can be deposited into each bin 26. The opening height H6 for each bin 26 can be greater than the induction endwall height H2. A size coefficient m can represent a ratio of the induction endwall height H2 to the opening height H6 (m=H2/H6). The size coefficient m can be between 0 and 1. In some embodiments, the size coefficient m can be in the range between 0.3 and 0.7, and preferably about 0.5. The opening height H6 for each bin 26 can optionally be substantially equivalent to the orthogonal height H4 of the sidewalk 60 thereof. For example, the opening height H6 can be between 90% and 110% of the sidewall height H4. Thus, in such embodiments, the induction endwall height H2 can be less than the sidewall height H4 by the size coefficient m. Moreover, in such embodiments, any items 4 that can be deposited into the bin 26 through the opening 68 will generally not extend above the top edge 60a of the sidewalls 60 as the items 4 sits upon the bin floor 50.

The bins 26 can optionally be spaced from each other on the rack 12 so as to define an orthogonal floor-to-floor distance H7 measured from the upper surface 52 of the floor 50 of one bin 26 to the lower surface 54 of the floor 50 of the bin 26 above along the orthogonal direction D2. The floor-to-floor distance H7 can be maintained at about the induction endwall height H2 plus the opening height H6 (H7=H2+H6). In such embodiments, a gap H8 measured between the top edge 60a of the sidewalls 60 of one bin 26 and the lower surface 54 of the floor 50 of the bin 26 above along the orthogonal direction D2 can be substantially equivalent to the induction endwall height H2. Thus, in such embodiments, the gap height H8 can be less than the opening height H6 by the size coefficient m.

As set forth above, the bin system 2 can direct the conveyance and sorting of items 4 such that each bin 26 receives a unit of items 34 that corresponds to a single customer order (or at least a portion of a single customer order). The system 2 can direct the items 4 of each unit 34 to a bin 26 sized such that the sum HS of the minimum dimensions H0 (i.e, the stacking height) of each unit 34 is preferably no greater than the sidewall height H4 of the bin 26. In this manner, the bin system 2 preferably recognizes the sidewall height H4 of each bin 26 as an upper limit or maximum of the stacking height (i.e., a maximum sum HS of the minimum dimensions H0) of any unit 34 assignable to the bin 26. However, in other embodiments, the bin system 2 can recognize the floor-to-floor distance H7 between one bin 26 and the bin 26 above as the maximum stacking height of a unit of items 34 deposited within the one bin 26, as shown in FIG. 7. In such embodiments, in the case of the topmost bin 26a of the column 28, the maximum stacking height can be defined as the sum of the induction endwall height H2 and the opening height H6.

In embodiments where the floor-to-floor distance H7 between vertically adjacent bins 26 is equivalent to the induction endwall height H2. plus the opening height H6 (H7=H2+H6), and the induction endwall height H2 of each bin 26 is less than the opening height H6 thereof (i.e., m<1), items 4 can be delivered at an intermediate vertical location at the induction end of each bin 26. Thus, the floor-to-floor distance H7 between bins 26 can be reduced, allowing more bins 26 to fit within the column 28 while substantially maintaining the opening height H6 for each bin 26, thus increasing the sort destination density provided by the rack 12. In embodiments where the bins 26 of a column 28 are sized and shaped similarly, and the induction endwall heights H2 are less than the respective opening heights H6, and the sidewall heights H4 are substantially equivalent to the respective opening heights H6 of each bin 26, the number n of bins 26 that can fit within a vertical rack space (i.e., H1) can be expressed by the following equation:

$$n = \frac{[(H1) - (L)\tan\alpha]}{[(m+1)(H6) + T]} \cos\alpha.$$

In one example embodiment of the sorting rack 12, the rack height H1 can be about 60 inches, and each bin 26 can define a slope angle α of about 7 degrees, a floor length L of about 18 inches, a floor thickness T of about 0.2 inch, a sidewall height H4 of about 4 inches, an induction endwall height H2 of about 2 inches (so that the size coefficient m is about 0.5). In this example, nine (9) bins 26 can fit within the rack height H1 while maintaining an opening height H6 substantially equivalent to the sidewall height H4 (about 4 inches). In the foregoing example, if the slope angle α is changed to 11 degrees, with the other dimensions remaining the same, eight (8) bins 26 can fit with the rack height while maintaining an opening height H6 substantially equivalent to the sidewall height H4, and nine (9) bins 26 can fit if the sidewall height H4 or the opening height H6 is reduced by only about 0.1 inch. While the foregoing examples apply to a column of bins 26 that are equally sized, it is to be appreciated that the sorting density of a column of variously sized bins 26 can also be increased by reducing the induction endwall heights H2 with respect to the opening heights H6.

It is to be appreciated that the bin dimensions and spacings set forth above are non-limiting examples of bin configurations in the sorting rack 12. The sorting rack 12 described above has the advantage of being able to relocate the bracket arms 42 to carry bins 26 of various sizes in any of the columns 28. The processor 32 can operate software that allows the system 2 to adjust the delivery locations of items 4 in the sorting rack 12 based on the location and sizes of the various bins 26 carried thereon.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A bin that is mountable on a sorting rack for receiving sorted items in an order fulfilment center, the bin comprising:
    an induction endwall and an outlet endwall opposite the induction endwall with respect to a longitudinal direction, wherein the induction endwall and the outlet endwall are each elongated along a lateral direction that is perpendicular to the longitudinal direction;
    a pair of opposed sidewalls extending from the induction endwall to the outlet endwall, each sidewall of the pair of opposed sidewalls defining a top edge;
    a pair of opposed mounting flanges extending outwardly from respective external surfaces of the pair of opposed sidewalls, each mounting flange of the pair of opposed mounting flanges defining a longitudinal flange axis that is oriented along the longitudinal direction;
    a floor extending from the induction endwall to the outlet endwall with respect to the longitudinal direction, the floor extending between the pair of opposed sidewalls with respect to the lateral direction, wherein the floor and the top edges of the pair of opposed sidewalls are each declined toward the outlet endwall at an angle in a range of about 6 degrees to about 14 degrees with respect to the longitudinal flange axis,
    wherein the induction endwall defines an induction endwall height measured from the floor to a top edge of the induction endwall along a vertical direction that is perpendicular to each of the longitudinal and lateral directions, each of the pair of opposed sidewalls defines a sidewall height measured from the floor to the top edge of the respective sidewall along the vertical direction, and the induction endwall height is 70% or less than 70% of each sidewall height.

2. The bin of claim 1, wherein the induction endwall height is 50% or less than 50% of each sidewall height.

3. The bin of claim 1, wherein the angle is between 7 degrees and 11 degrees.

4. The bin of claim 1, wherein the outlet endwall defines a top edge, and the outlet endwall also defines an outlet endwall height measured from the floor to the top edge of the outlet endwall along the vertical direction, wherein the outlet endwall height is less than the induction endwall height.

5. The bin of claim 4, wherein the bin includes a flexible band positioned above the outlet endwall along the vertical direction, the flexible band extending between the pair of opposed sidewalls along the lateral direction.

6. A bin system, comprising:
   a rack having an induction side and an outlet side spaced from the induction side along a horizontal direction, the rack having a plurality of support features spaced from each other along a vertical direction that is substantially perpendicular to the horizontal direction;
   a plurality of bins, each bin of the plurality of bins including at least one horizontal mounting formation that is mounted to at least one of the support features so that the bins are vertically aligned on the rack, each bin of the plurality of bins defining:
      an induction endwall at the induction side of the rack and an outlet endwall opposite the induction endwall;
      a floor extending from the induction endwall to the outlet endwall at a downward slope angle in a range of about 6 degrees to about 14 degrees with respect to the horizontal direction; and
      a pair of opposed sidewalls extending between the induction and outlet endwalls,
   wherein at least two bins of the plurality of bins at least partially define an induction opening having an opening height measured between a top edge of the induction endwall of a first bin of the at least two bins and the floor of a second bin of the at least two bins, wherein the opening height is greater than an induction endwall height defined by the induction endwall of the first bin.

7. The bin system of claim 6, wherein a ratio between the induction endwall height and the opening height is in a range of about 0.3:1 to about 0.7:1.

8. The bin system of claim 7, wherein the ratio is about 0.5:1.

9. The bin system of claim 6, wherein the rack defines a bottom and a top spaced from each other along the vertical direction, wherein a topmost one of the plurality of bins is mounted to the rack such that the induction endwall of the topmost one of the plurality of bins is spaced from a bottom surface of a top portion of the rack along the vertical direction by at least the opening height.

10. The bin system of claim 9, wherein the downward slope angle of the floor of each bin is in a range of about 7 degrees to about 11 degrees.

11. The bin system of claim 10, wherein the rack defines a rack height in a range of about 54 inches to about 60 inches between the bottom and the top along the vertical direction.

12. The bin system of claim 11, wherein the induction endwall height of each induction endwall is in a range of about 1 inch to about 3 inches.

13. The bin system of claim 12, wherein the plurality of bins includes at least 9 bins vertically aligned on the rack.

14. The bin system of claim 13, wherein the opposed sidewalls of each bin define a sidewall height, and the opening height is between 90% and 110% of the sidewall height of at least one of the bins.

15. The bin system of claim 14, wherein the floor of each bin has a length in a range of about 15 inches to about 18 inches.

16. The bin system of claim 11, wherein a sidewall height of a pair of opposed sidewalls of at least one of the bins is different than a sidewall height of a pair of opposed sidewalls of at least another one of the bins, and the slope angle is the same for each of the plurality of bins.

17. The bin system of claim 6, wherein each of the support features comprises a pair of bracket arms extending from the rack, each bracket arm of the pair of bracket arms defines a longitudinal axis oriented along the horizontal direction, and the at least one horizontal mounting formation of each bin comprises a pair of mounting flanges extending outwardly from the opposed sidewalls along a lateral axis that is substantially perpendicular to the vertical and horizontal directions, and each pair of mounting flanges is configured to couple with any of the pairs of bracket arms.

18. The bin system of claim 6, wherein the floor of each bin is substantially smooth so as to minimize a coefficient of friction along an upper surface of each floor.

19. The bin system of claim 6, wherein the outlet endwall of each bin defines a top edge and an outlet endwall height measured from the upper surface of the floor to the top edge of the outlet endwall, and the outlet endwall height that is substantially equivalent to the induction endwall height.

20. The bin system of claim 19, wherein each bin includes a flexible band positioned above the outlet endwall, the flexible band extends between the opposed sidewalls so as to define a vertical gap between the flexible band and the outlet endwall.

* * * * *